United States Patent
Knoppert et al.

(10) Patent No.: US 10,185,368 B2
(45) Date of Patent: *Jan. 22, 2019

(54) STAGED SNAP HINGE WITH ADJUSTABILITY

(71) Applicant: Dell Products L.P., Round Rock, TX (US)

(72) Inventors: Michiel Knoppert, Amsterdam (NL); Deeder Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,469

(22) Filed: Aug. 22, 2017

(65) Prior Publication Data

US 2018/0059738 A1    Mar. 1, 2018

Related U.S. Application Data

(63) Continuation of application No. 15/250,525, filed on Aug. 29, 2016, now Pat. No. 9,785,200.

(51) Int. Cl.
*G06F 1/16* (2006.01)
(52) U.S. Cl.
CPC .......... *G06F 1/1681* (2013.01); *G06F 1/1615* (2013.01); *G06F 1/1616* (2013.01); *G06F 1/1618* (2013.01)
(58) Field of Classification Search
CPC .... G06F 1/1681; G06F 1/1615; G06F 1/1616; G06F 1/1618

USPC ............. 361/679.01–679.3, 679.55–679.59; 16/221–392

See application file for complete search history.

(56) References Cited

U.S. PATENT DOCUMENTS

| | | | | |
|---|---|---|---|---|
| 8,005,521 | B2* | 8/2011 | Cho | H04M 1/0216 379/433.13 |
| 9,047,055 | B2* | 6/2015 | Song | E05D 3/14 |
| 2003/0114184 | A1* | 6/2003 | Wilson | H04M 1/0216 455/550.1 |
| 2004/0266502 | A1* | 12/2004 | Holtorf | B32B 3/04 455/899 |
| 2007/0117600 | A1* | 5/2007 | Robertson, Jr. | H04M 1/0216 455/575.3 |
| 2008/0125195 | A1* | 5/2008 | Maenpaa | H04M 1/0216 455/575.3 |

(Continued)

*Primary Examiner* — Nidhi Thaker
(74) *Attorney, Agent, or Firm* — Baker Botts L.L.P.

(57) ABSTRACT

Systems and methods are disclosed for rotationally coupling housing portions of an information handling system. An information handling system includes a housing having a first housing portion and a second housing portion. The information handling system also includes a hinge assembly coupling the first and second housing portions, the hinge assembly comprising a first snapping band with a bi-stable structure having an engaged and a disengaged position, the first snapping band configured to engage when the first and second housing portions are rotated at a first angle, and a second snapping band with a bi-stable structure having an engaged and a disengaged position, the second snapping band configured to engage when the first and second housing portions are rotated at a second angle. In addition, the information handling system includes a flexible display coupled to the first housing portion and the second housing portion.

14 Claims, 10 Drawing Sheets

(56) References Cited

U.S. PATENT DOCUMENTS

| | | | | |
|---|---|---|---|---|
| 2012/0307423 A1* | 12/2012 | Bohn | ............... | G06F 1/1641 |
| | | | | 361/679.01 |
| 2014/0196253 A1* | 7/2014 | Song | ............... | G06F 1/1601 |
| | | | | 16/225 |
| 2016/0091923 A1* | 3/2016 | Morrison | ............ | G06F 1/1616 |
| | | | | 345/55 |

* cited by examiner

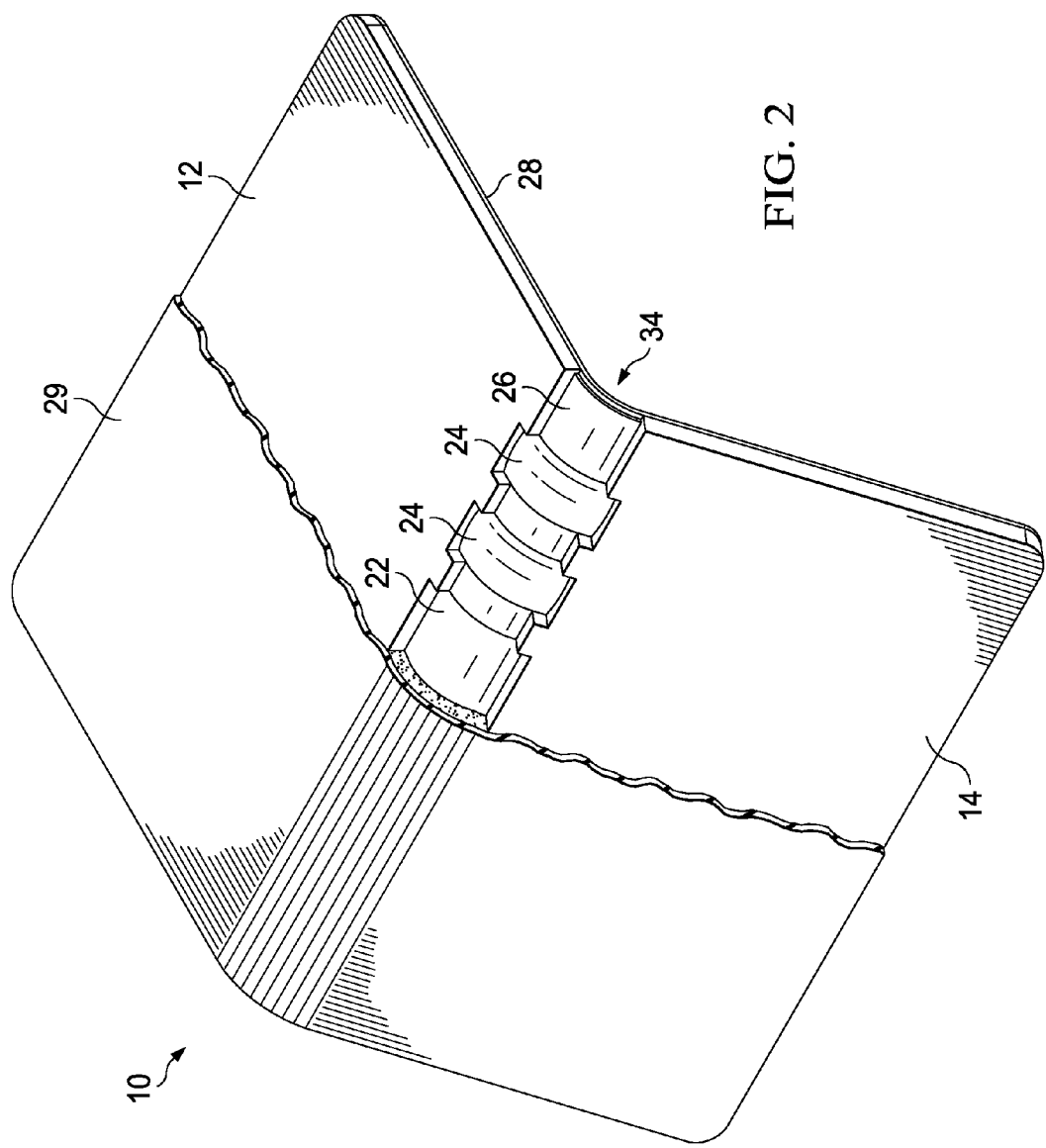

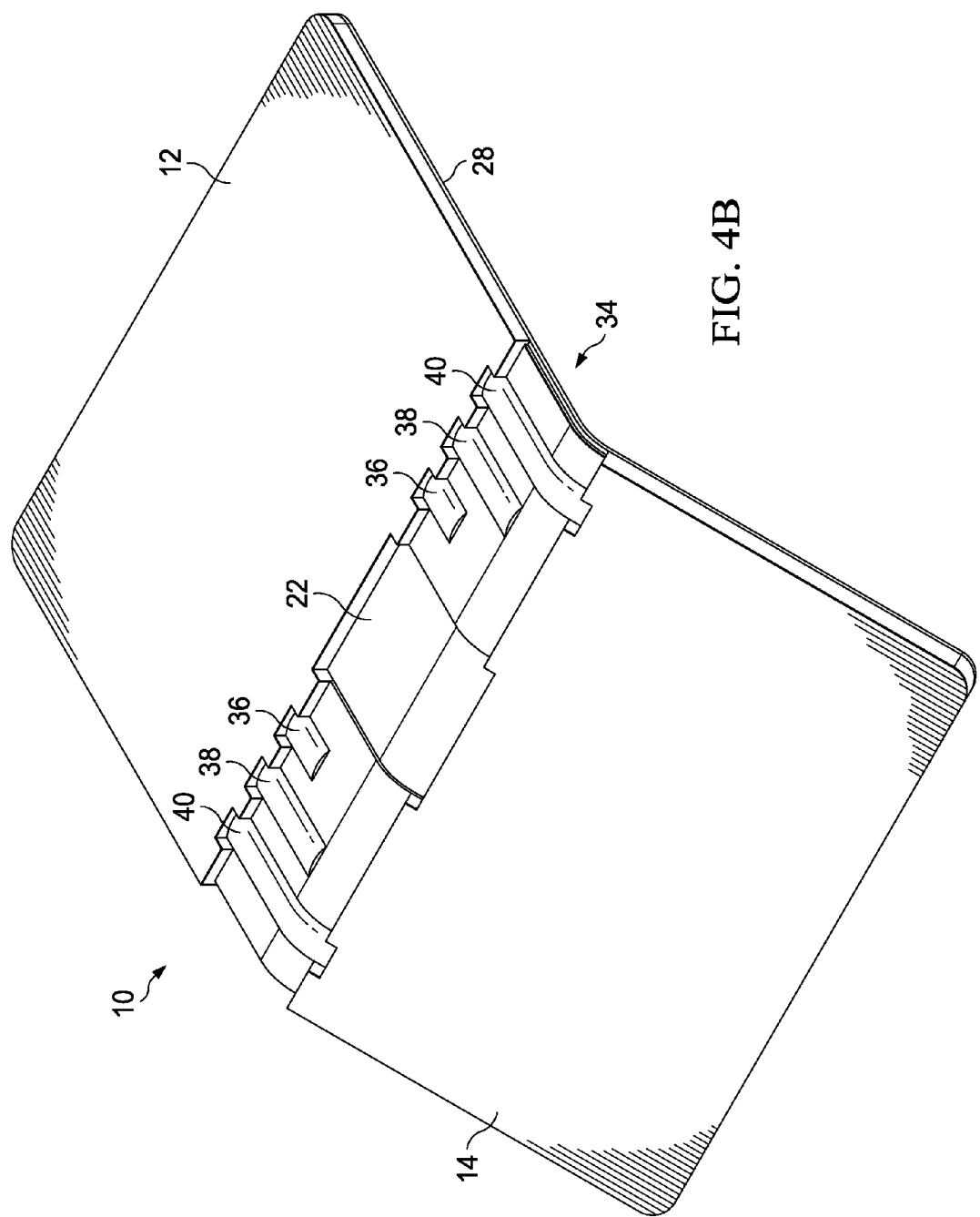

STAGED SNAP HINGE WITH ADJUSTABILITY

RELATED APPLICATIONS

This application is a continuation of U.S. patent application Ser. No. 15/250,525 filed Aug. 29, 2016, the contents of which is incorporated by reference herein.

TECHNICAL FIELD

This disclosure relates generally to information handling systems and, more particularly, to a staged snap hinge with adjustability.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable information handling systems, such as, smart phones, tablet computers, notebook computers, media players, digital cameras, 2-in-1 tablet-laptop combination computers, wireless organizers, and/or combinations thereof. A portable information handling system may generally be any device that a user may carry for handheld use and that includes a processor. Portable information handling systems may include one or more flexible displays that bend and flex as the portable information handling system is adjusted between various positions by the user. Such bending may cause stress to the flexible display. Thus, it may be desirable to control the stress caused to a display as the portable information handling system is adjusted between various positions.

SUMMARY

In some embodiments, an information handling system is disclosed that includes a housing having a first housing portion and a second housing portion. The system also includes a hinge assembly coupling the first and second housing portions, the hinge assembly comprising a first snapping band with a bi-stable structure having an engaged and a disengaged position, the first snapping band configured to engage when the first and second housing portions are rotated at a first angle, and a second snapping band with a bi-stable structure having an engaged and a disengaged position, the second snapping band configured to engage when the first and second housing portions are rotated at a second angle. In addition, the system includes a flexible display coupled to the first housing portion and the second housing portion, the flexible display covering the hinge assembly, the flexible display configured to bend when the first and second housing portions are rotated.

In another embodiment, a method is disclosed that includes rotationally coupling a first housing portion and a second housing portion of the portable information handling system with a hinge assembly, the hinge assembly comprising a first snapping band with a bi-stable structure having an engaged and a disengaged position, the first snapping band configured to engage when the first and second housing portions are rotated at a first angle, and a second snapping band with a bi-stable structure having an engaged and a disengaged position, the second snapping band configured to engage when the first and second housing portions are rotated at a second angle. The method also includes coupling a flexible display to the first housing portion and the second housing portion, the flexible display covering a portion of the hinge assembly, the flexible display configured to bend when the first and second housing portions are rotated.

In a further embodiment, a hinge assembly for an information handling system is disclosed that includes a first snapping band with a bi-stable structure having an engaged and a disengaged position, the first snapping band configured to engage when a first housing portion of the information handling system is rotated at a first angle to a second housing portion of the information handling system. The system also includes a second snapping band with a bi-stable structure having an engaged and a disengaged position, the second snapping band configured to engage when the first housing portion is rotated at a second angle to the second housing portion.

BRIEF DESCRIPTION OF THE DRAWINGS

For a more complete understanding of the present invention and its features and advantages, reference is now made to the following description, taken in conjunction with the accompanying drawings, in which:

FIG. 2 illustrates a perspective view of a portable information handling system having rotationally-coupled housing portions;

FIG. 4B illustrates a stagger staged arrangement of snapping bands in a hinge assembly arranged in a partially open position;

DETAILED DESCRIPTION

Figure 1:
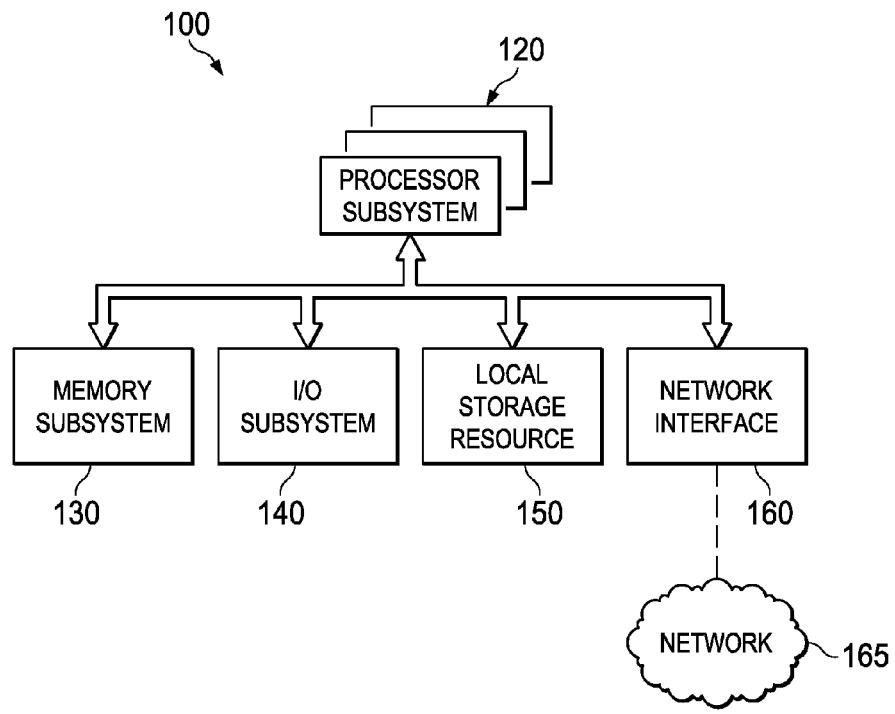
FIG. 1 illustrates a block diagram of selected elements of an embodiment of a portable information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, portable information handling systems may include one or more flexible displays. Such displays may bend as the portable information handling system is rotated, bent, and/or adjusted to different positions. Such bending may cause stress (e.g., tensile stress) on the flexible display at or near the bend location(s), which in turn may affect the structural integrity, performance, and/or durability of the display. For example, a flexible display may extend over a portion of a hinge assembly rotationally coupling housing portions of the portable information handling system. As the housing portions rotate to different positions relative to each other, the flexible display may bend at different degrees, resulting in varying amounts of stress on the flexible display at or near the hinge location. As described in more detail below, the hinge assembly may be designed to control and reduce the stress on the flexible display as the housing portions are rotated.

For the purposes of this disclosure, an information handling system may include an instrumentality or an aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Particular embodiments are best understood by reference to FIGS. 1-5 wherein like numbers are used to indicate like and corresponding parts.

FIG. 1 illustrates a block diagram of selected elements of an embodiment of a portable information handling system 100 in accordance with some embodiments of the present disclosure. In various embodiments, portable information handling system 100 may represent different types of portable information handling systems, such as, smart phones, tablet computers, notebook computers, media players, digital cameras, 2-in-1 tablet-laptop combination computers, and wireless organizers. Components of portable information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160. External or remote elements, such as network 165, are also shown to give context to an environment in which portable information handling system 100 may be configured to operate.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

System bus 121 may represent a variety of suitable types of bus structures, including for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, Integrated Interchip Sound (IIS) bus, Serial Peripheral Interface (SPI) bus, and Video Electronics Standards Association (VESA) local bus, among others. Although illustrated as a single bus in FIG. 1, system bus 121 may be implemented as a combination of one or more suitable busses, and in some embodiments, various components may use one or more different busses to communicate with other components of portable information handling system 100.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as portable information handling system 100, is powered down.

In portable information handling system 100, I/O subsystem 140 may comprise a system, device, or apparatus generally operable to receive and/or transmit data to/from/within portable information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter. The touch panel (not shown) may include circuitry for enabling touch functionality in conjunction with a display (not shown) that is driven by display adapter (not shown).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In addition to local storage resources 150, in some embodiments, portable information handling system 100 may communicatively couple via network 165 to a network storage resource (not shown) using network interface 160 discussed below.

Network interface 160 may be a suitable system, apparatus, or device operable to serve as an interface between portable information handling system 100 and network 165. Network interface 160 may enable portable information handling system 100 to communicate over network 165 using any suitable transmission protocol and/or standard, including, but not limited to various transmission protocols and/or standards. Network 165 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, network 165 communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165, network interface 160, and/or various components associated therewith may be implemented using hardware, software, or any combination thereof. Network interface 160 may enable wired and/or wireless communications to and/or from portable information handling system 100.

FIG. 2 is a perspective view of a portable information handling system having rotationally-coupled housing portions. In the example embodiment, a main housing portion 12 rotationally couples to a lid housing portion 14 to support various configurations to interact with an end user. More specifically, main housing portion 12 couples to lid housing portion 14 via hinge assembly 34 such that a user may rotate main housing portion 12 and/or lid housing portion 14 relative to each other. Main housing portion 12 and lid housing portion 14 may hold one or more components of the portable information handling system, including but not limited to processor subsystem 120, system bus 121, memory subsystem 130, I/O subsystem 140, local storage resource 150, and network interface 160 discussed above with respect to FIG. 1.

In some embodiments, portable information handling system 10 may include one or more displays for visually presenting information. For example, display 28 may be a touch panel with circuitry enabling touch functionality in conjunction with a display such that a user may provide input to portable information handling system 10 through the display. In some embodiments, display 28 may be flexible such that it can bend and change shapes while still visually presenting information to and/or accepting input from the user. For example, display 28 may be an organic light-emitting diode (OLED) formed on a flexible plastic, such as polyethylene terephthalate. In some embodiments, display 28 may couple to main housing portion 12 and lid housing portion 14 such that display 28 extends over at least some portion of hinge assembly 34.

As explained below in further detail, hinge assembly 34 allows main housing portion 12 and lid housing portion 14 to rotate between a plurality of positions. For example, when portable information handling system 10 is not in use, lid housing portion 14 may be closed over the top of main housing portion 12 so that display 28 is protected from unintended use or damage. Rotation of lid housing portion 14 by approximately 90 degrees from main housing portion 12 brings display 28 in a raised "laptop" position. In some embodiments, laptop position may represent lid housing portion 14 open between approximately 1 and 179 degrees from main housing portion 12 (as illustrated in FIG. 2). Rotation of lid housing portion at approximately 180 degrees from main housing portion 12 may place portable information handling system 10 in "tablet" and/or "table" position. In tablet position, display 28 is flat and exposed to accept touch inputs and display information. Display 28 may bend at varying degrees as portable information handling system 10 is moved between positions (e.g., tablet, laptop, closed positions). In any position, user inputs may be communicated to an I/O subsystem and/or processor subsystem of the portable information handling system for processing, and then updated information may be communicated back to display 28 for displaying to the user.

In some embodiments, the hinge assembly of the portable information handling system may be a staged snap hinge. For example, hinge assembly 34 may include one or more snapping bands 24 formed of an arched and curved material. When the portable information handling system is in closed position, snapping bands 24 may be disengaged, such that the snapping bands curl and cause the housing portions to maintain a closed position. As the housing portions are rotated apart (e.g., from closed to laptop or tablet mode), snapping bands 24 may engage to hold hinge assembly 34 in the selected position. Hinge assembly may also include stabilizer 22 that bends to different positions and provides stability to hinge assembly 34.

Figure 2A:
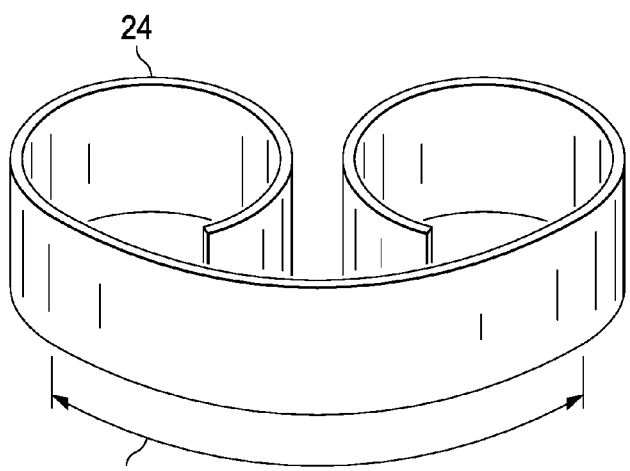
FIG. 2A illustrates a snapping band in disengaged position.
Figure 2B:
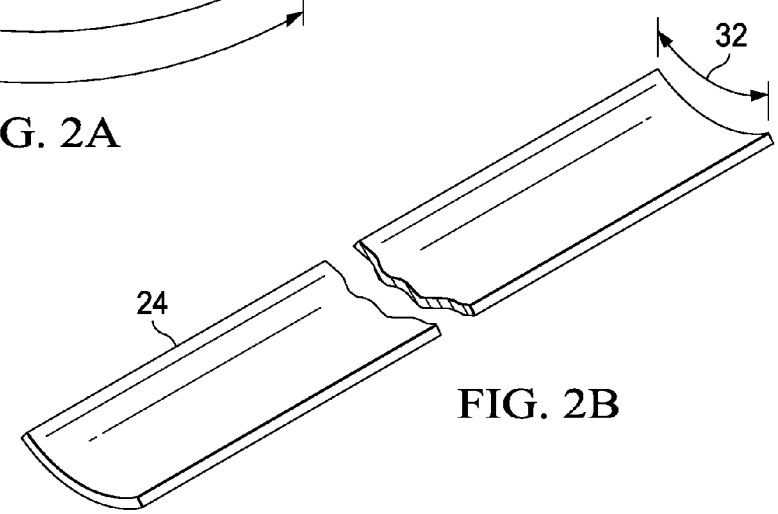
FIG. 2B illustrates a snapping band in engaged position.

Snapping bands 24 may be a bi-stable structure formed of two curvature axes. FIG. 2A illustrates a snapping band in disengaged position. Snapping band 24 may be formed of a resilient flexible material that curls lengthwise (e.g., to form curve 30) in disengaged position. Snapping band 24 may be comprised of a carbon fiber or Kevlar™ composite, tempered or spring steel, and/or other resilient flexible materials. The materials of snapping bands 24 may be manufactured or processed such that the band curls lengthwise in a disengaged position. FIG. 2B illustrates a snapping band in an engaged position. Snapping band 24 also include a widthwise curve, illustrated by curve 32. As snapping band 24 is rolled out straight, the widthwise curve of snapping band 24 provides a counter force to the curling force of the lengthwise curve. In engaged position, snapping band 24 snaps into a lengthwise straight position such that the forces on curvature axes offset each other. The stability and operation of snapping band 24 may be dependent on the material, thickness, dimensions, curve, and/or curvature axes of the snapping band.

Returning now to FIG. 2, one or more snapping bands 24 may be used hinge assembly 34. In closed position, snapping bands 24 may be disengaged, such that the lengthwise curl applies a force to curl the ends of the band toward each other (e.g., to the position illustrated in FIG. 2A). Snapping bands 24 may be placed in hinge assembly 34 such that the force of the lengthwise curl applies a closing force on the hinge assembly. As the housing portions of portable information handling system 10 are rotated open from closed position one or more snapping bands 24 may engage (e.g., to the position illustrated in FIG. 2B), such that the snapping band(s) straighten out lengthwise and cease to apply a closing force on the hinge assembly. In engaged position, snapping band 24 may help offset the closing force from the lengthwise curling of other disengaged snapping bands 24. As explained in more detail below with respect to FIGS. 3 and 4, snapping bands 24 may be staged to engage at different rotational positions of hinge assembly 34. Thus, snapping bands 24 may be used to control the rotation of hinge assembly 34 and the housing portions coupled to the hinge assembly.

The hinge assembly of the portable information handling system may also include one or more stabilizer materials. Stabilizer 22 may be comprised of a rigid yet bendable material. In some embodiments, stabilizer 22 may be comprised of a composite of metal, such as annealed copper. Stabilizer 22 may change shape (e.g., bend or fold) in response to applied force, such as when a user opens and/or closes the housing portions of portable information handling system 10. The rigidity of stabilizer 22 may affect how much force is required to rotate hinge assembly 34 open and closed. Thus, stabilizer 22 may hold the housing portions of portable information handling system 10 in a particular position and resist unintended movements of the housing portions caused by, for example, user adjustment of the system in his or her lap or hands. In some embodiments, stabilizer 22 may include one more lengthwise slits (as illustrated in FIG. 2) to control the bending direction and/or rigidity of stabilizer 22. The size, shape, design, and material of stabilizer 22 may be selected based on the design, structural integrity, performance, cost, and/or durability of hinge assembly 34 and/or portable information handling system 10.

As explained above, hinge assembly 34 may rotationally couple the housing portions of the portable information handling system. One or more snapping bands 24 and/or stabilizers 22 may couple to main housing portion 12 and lid housing portion 14. In some embodiments, hinge assembly 34 may also include one or more coupling materials 26. Coupling material 26 may extend between main housing portion 12 and lid housing portion 14. Coupling material 26 may also couple to snapping bands 24 and/or stabilizer 22. As hinge assembly 34 rotates, coupling material 26 may bend or fold to the different rotational positions. In some embodiments, coupling material 26 may be formed of a resilient flexible material, similar to those discussed above with respect to snapping bands 24 (e.g., carbon fiber or Kevlar™ composite, tampered or spring steel, and/or other resilient flexible materials). In some embodiments, coupling material 26 may be manufactured or processed such that the material curls lengthwise, thereby adding an additional closing force to hinge assembly 34.

In some embodiments, the reverse side of the hinge assembly (e.g., the side not covered by display 28) may include an elastic cover 29. Elastic cover 29 may be comprised of a malleable material, such as an elastic thermoplastic, that may compress and/or stretch as the housing portions rotate in different positions to each other. Elastic cover 29 may extend from main housing portion 12 to lid housing portion 14 such that it covers hinge assembly 34. Elastic cover 29 protects snapping bands 24 and/or stabilizer 22 from direct contact by objects and debris external to the portable information handling system. Elastic cover 29 may also provide stability to hinge assembly 34 by restricting the movement of snapping bands 24 and/or stabilizer 22.

Snapping bands may be staged in different arrangements within hinge assembly 34. FIGS. 3A-D illustrate a gap staged arrangement of snapping bands in a hinge assembly arranged in different positions. As the housing portions of the portable information handling system are moved between the various positions illustrated in FIGS. 3A-D, one or more of the snapping bands in the hinge assembly may change state (e.g., from engage to disengaged, or vice versa), thereby controlling the shape of the hinge assembly and the positioning of the housing portions.

Figure 3A:
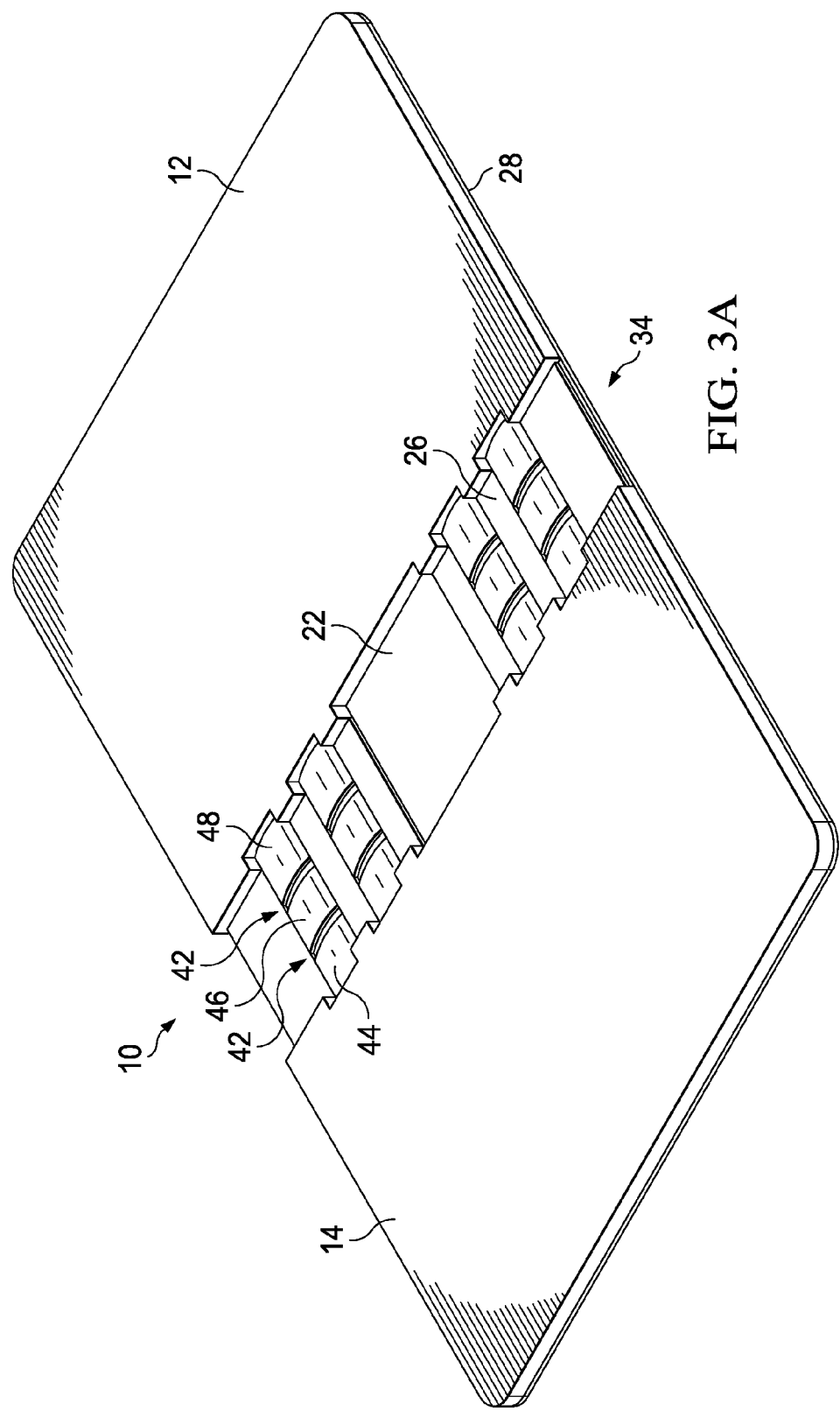
FIG. 3A illustrates a gap staged arrangement of snapping bands in a hinge assembly arranged in a fully open position.

FIG. 3A illustrates a gap staged arrangement of snapping bands in a hinge assembly arranged in a fully open position. Snapping bands 44, 46, and 48 are arranged across hinge assembly 34, between main housing portion 12 and lid housing portion 14. In the illustrated embodiment, the housing portions are arranged in tablet position. Display 28 may rest on the flat surface created by the housing portions. Snapping bands 44, 46, and 48 are in engaged position (e.g., the position illustrated in FIG. 2B), such that each snapping band extends in lengthwise straight position. Coupling material 26 and stabilizer 22 within hinge assembly 34 may also be flat in this position. Gaps 42 may separate snapping bands 44, 46, and 48 such that each snapping band may engage and disengage independently of each other.

Figure 3B:
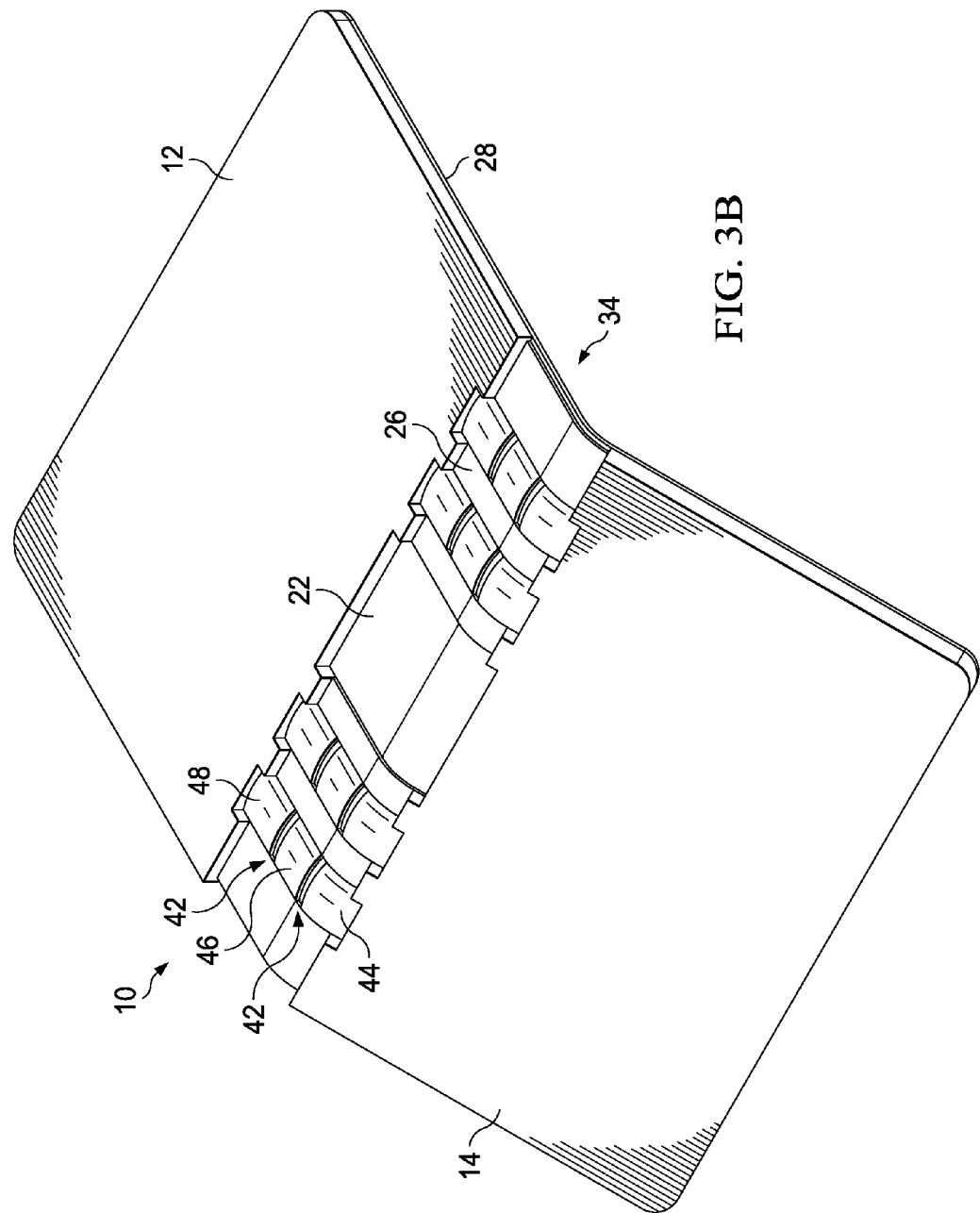
FIG. 3B illustrates a gap staged arrangement of snapping bands in a hinge assembly arranged in a partially open position.

FIG. 3B illustrates a gap staged arrangement of snapping bands in a hinge assembly arranged in a partially open position. In the illustrated embodiment, lid housing portion 14 may be rotated relative to main housing portion 12, bringing portable information handling system into laptop position. Display 28 may bend along the curve formed by hinge assembly 34 as it stretches between the housing portions. Snapping bands 44 may disengage such that the band begins to curl, as illustrated in FIG. 2A. The force of the lengthwise curl may apply a closing force on hinge assembly 34. However, snapping bands 46 and 48 may remain in engaged position (as illustrated in FIG. 2B), such that each snapping band extends in lengthwise straight position. Coupling material 26 and stabilizer 22 within hinge assembly 34 may bend near snapping bands 44, but otherwise remain flat near snapping bands 46 and 48. Coupling material 26, stabilizer 22, and the force of the lengthwise curl from snapping bands 44 may hold lid housing portion 14 in positions relative to main housing portion 12.

Figure 3C:
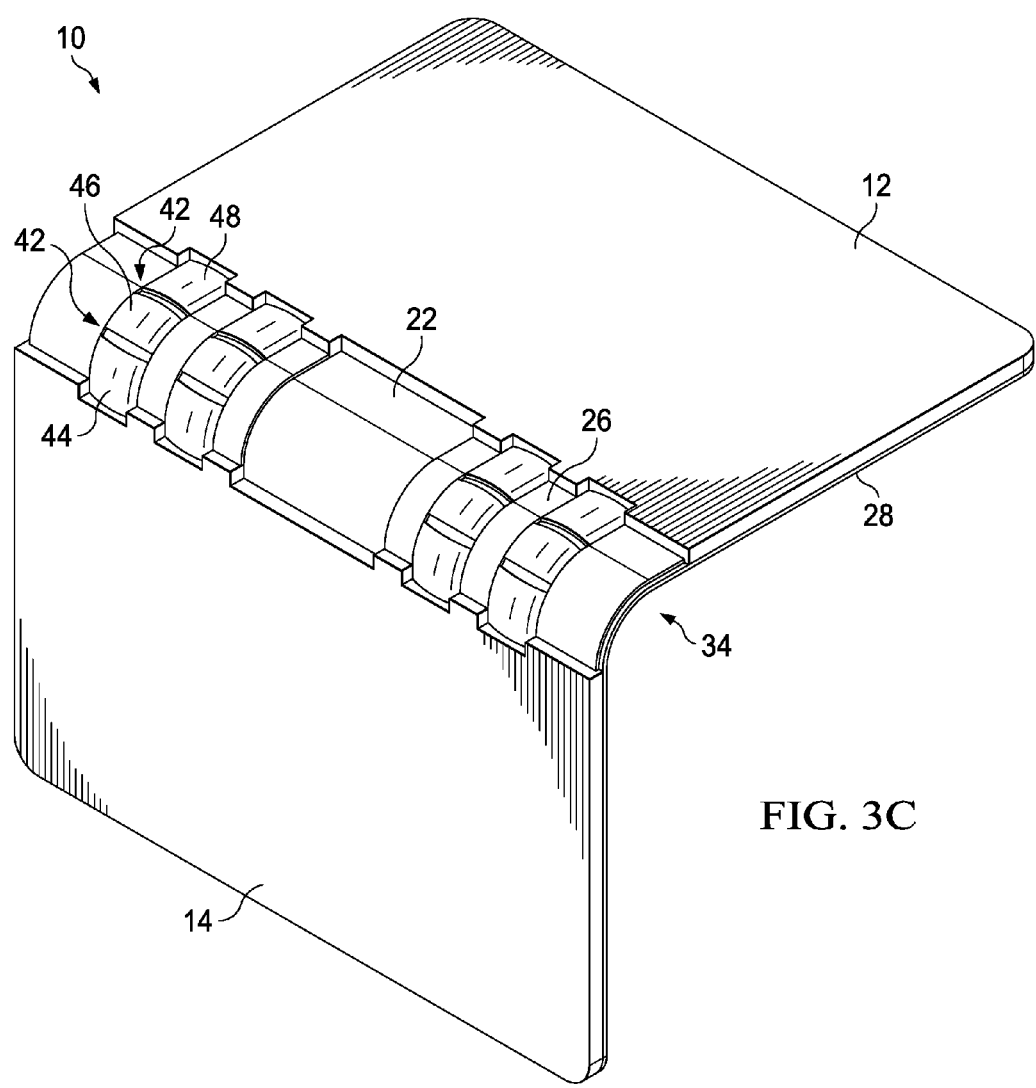
FIG. 3C illustrates a gap staged arrangement of snapping bands in a hinge assembly arranged in a partially open position.

FIG. 3C illustrates a gap staged arrangement of snapping bands in a hinge assembly arranged in a partially open position. In the illustrated embodiment, lid housing portion 14 may be rotated relative to main housing portion 12, such that portable information handling system 10 is in laptop position. Snapping bands 44 and 46 may disengage such that the bands begin to curl lengthwise. The force of the lengthwise curls may apply an increased (compared to arrangement discussed above with respect to FIG. 3B) closing force on hinge assembly 34. Snapping bands 48 may remain in engaged position, extended in lengthwise straight position. Coupling material 26 and stabilizer 22 within hinge assembly 34 may bend near snapping bands 44 and 46, but otherwise remain flat near snapping bands 48. Coupling material 26, stabilizer 22, and the force of the lengthwise curl from snapping bands 44 and 46 may hold lid housing portion 14 in position relative to main housing portion 12.

Figure 3D:
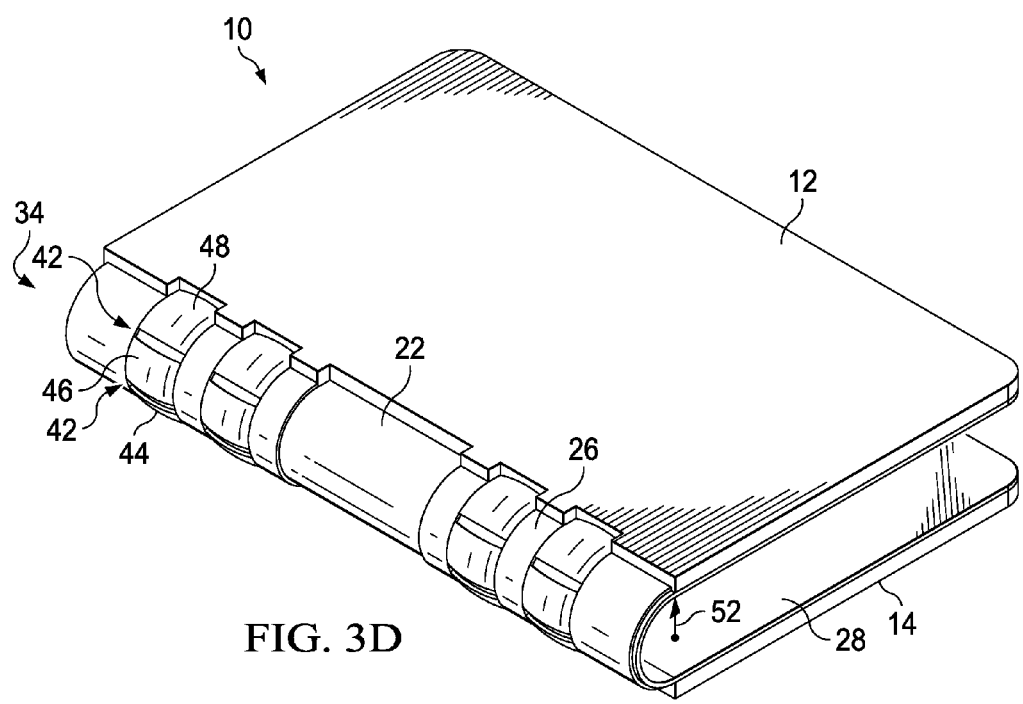
FIG. 3D illustrates a gap staged arrangement of snapping bands in a hinge assembly arranged in a closed position.

FIG. 3D illustrates a gap staged arrangement of snapping bands in a hinge assembly arranged in a close position. In the illustrated embodiment, lid housing portion 14 may be rotated relative to main housing portion 12, such that portable information handling system 10 is in closed position. Snapping bands 44, 46 and 48 may disengage such that the bands begin to curl lengthwise. The force of the lengthwise curls may apply an increased (compared to arranged discussed above with respect to FIGS. 3A-C) closing force on hinge assembly 34. Coupling material 26 and stabilizer 22 within hinge assembly 34 may bend near snapping bands 44, 46, and 48. Coupling material 26, stabilizer 22, and the force of the lengthwise curl from snapping bands 44, 46 and 48 may hold lid housing portion 14 in position relative to main housing portion 12.

As the housing portions of the portable information handling system are rotated between different positions, one or more of the snapping bands in the hinge assembly may engage. The engaging of a snapping band may increase the rigidity of hinge assembly 34, and thus increase the stability to the housing portions of the system. The snapping bands in the hinge assembly may be staged to engage at particular angles of rotation that represent desirable positions of portable information handling system. Stabilizer 22, with its rigidity, may hold hinge assembly at particular angles between the engagement and disengagement of snapping bands. The number, size, and placement of snapping bands may be selected based on the design, structural integrity, performance, cost, and/or durability of hinge assembly 34 and/or portable information handling system 10.

In some embodiments, the snapping bands may be varied in placement, material, and/or dimension (e.g., the curvature of one or more of the axes, length, width, and/or the thickness of the material). For example, snapping bands 44 may be the first snapping bands to engage when lid housing portion 14 is raised from tablet position to laptop position. As such, snapping bands 44 may experience the strongest rotational force (e.g., in the direction of maintaining the hinge assembly open) caused by the weight of lid housing portion 14. Snapping bands 44 may therefore be comprised of thicker and/or more rigid material (compared to snapping bands 46 and 48), and/or sized differently (e.g., wider band and/or smaller lengthwise curve) to increase the closing force applied by the band on the hinge assembly.

FIGS. 4A-D illustrate a stagger staged arrangement of snapping bands in a hinge assembly arranged in different positions. As the housing portions of the portable information handling system are moved between the various positions illustrated in FIG. 4A-D, one or more of the snapping bands in the hinge assembly may change state (e.g., from engage to disengaged, or vice versa), thereby controlling the shape of the hinge assembly and the positioning of the housing portions.

Figure 4A:
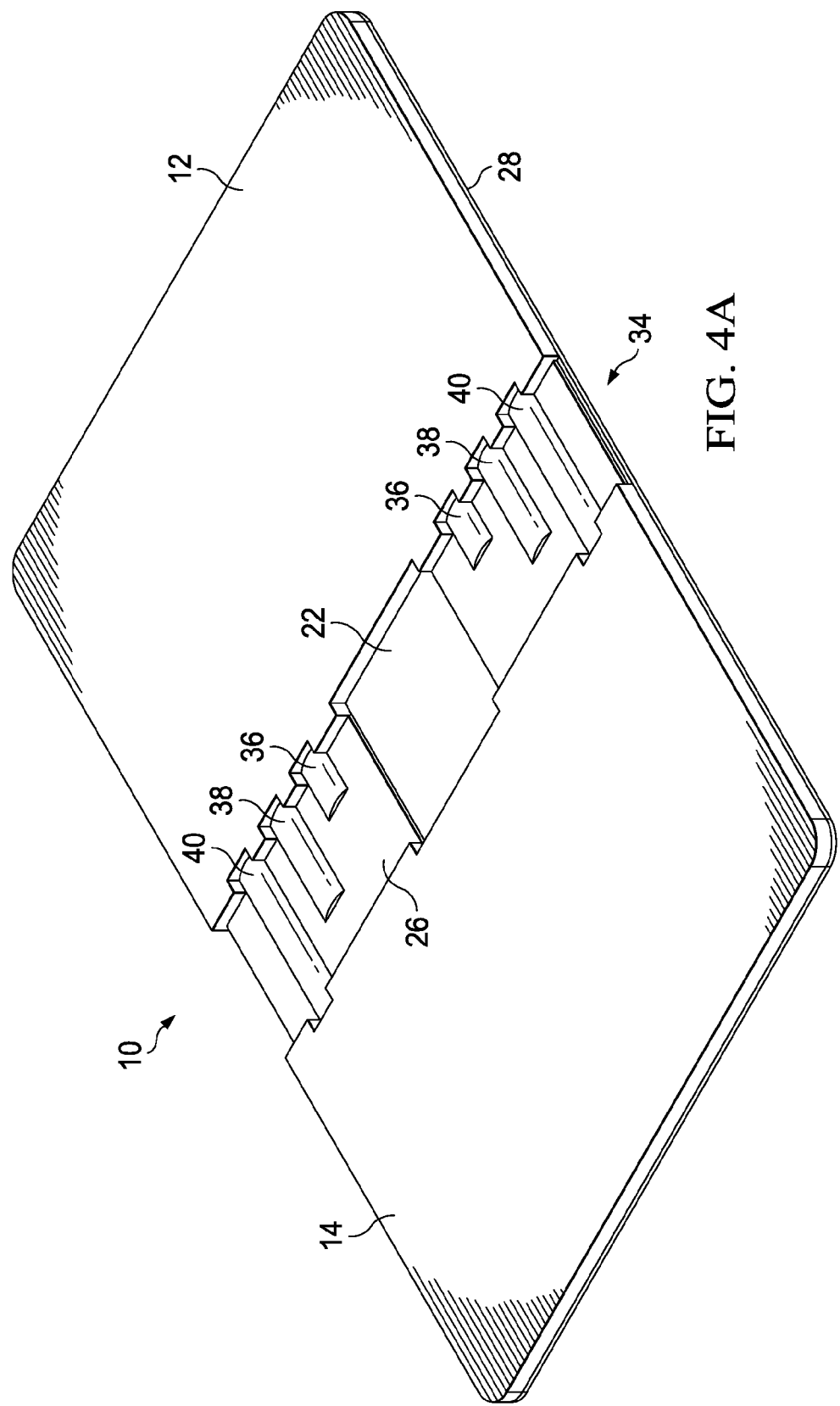
FIG. 4A illustrates a stagger staged arrangement of snapping bands in a hinge assembly arranged in a fully open position.

FIG. 4A illustrates a stagger staged arrangement of snapping bands in a hinge assembly arranged in a fully open position. Snapping bands 36, 38, and 40 are arranged in parallel across portions of hinge assembly 34, between main housing portion 12 and lid housing portion 14. In the illustrated embodiment, the housing portions are arranged in tablet position. Display 28 may rest on the flat surface created by the housing portions. Snapping bands 36, 38, and 40 are in engaged position (e.g., as illustrated in FIG. 2B), such that each snapping band extends in lengthwise straight position. Coupling material 26 and stabilizer 22 within hinge assembly 34 may also be flat in this position. Snapping bands 36, 38, and 40 may be placed at different locations along the length of hinge assembly 34 such that each may engage and disengage independently of each other.

FIG. 4B illustrates a stagger staged arrangement of snapping bands in a hinge assembly arranged in a partially open position. In the illustrated embodiment, lid housing portion 14 may be rotated relative to main housing portion 12, bringing portable information handling system into laptop position. Display 28 may bend along the curve formed by hinge assembly 34 as it stretches between the housing portions. Snapping bands 40 may disengage such that the bands begin to curl, as illustrated in FIG. 2A. The force of the lengthwise curl may apply a closing force on hinge assembly 34. Snapping bands 36 and 38 may remain in engaged position, such that each snapping band extends in a lengthwise straight position. Snapping bands 36 and 38 in engaged position may maintain portions of hinge assembly 34 in a relatively flat position. Snapping bands 36 and 38 in engaged position may also limit and/or prevent certain portions of snapping bands 40 from curling lengthwise. Coupling material 26 and stabilizer 22 within hinge assembly 34 may bend near the curling portions of snapping bands 40, but otherwise remain flat near snapping bands 36 and 38. Coupling material 26, stabilizer 22, and the force of the lengthwise curl from snapping band 40 may hold lid housing portion 14 in positions relative to main housing portion 12.

Figure 4C:
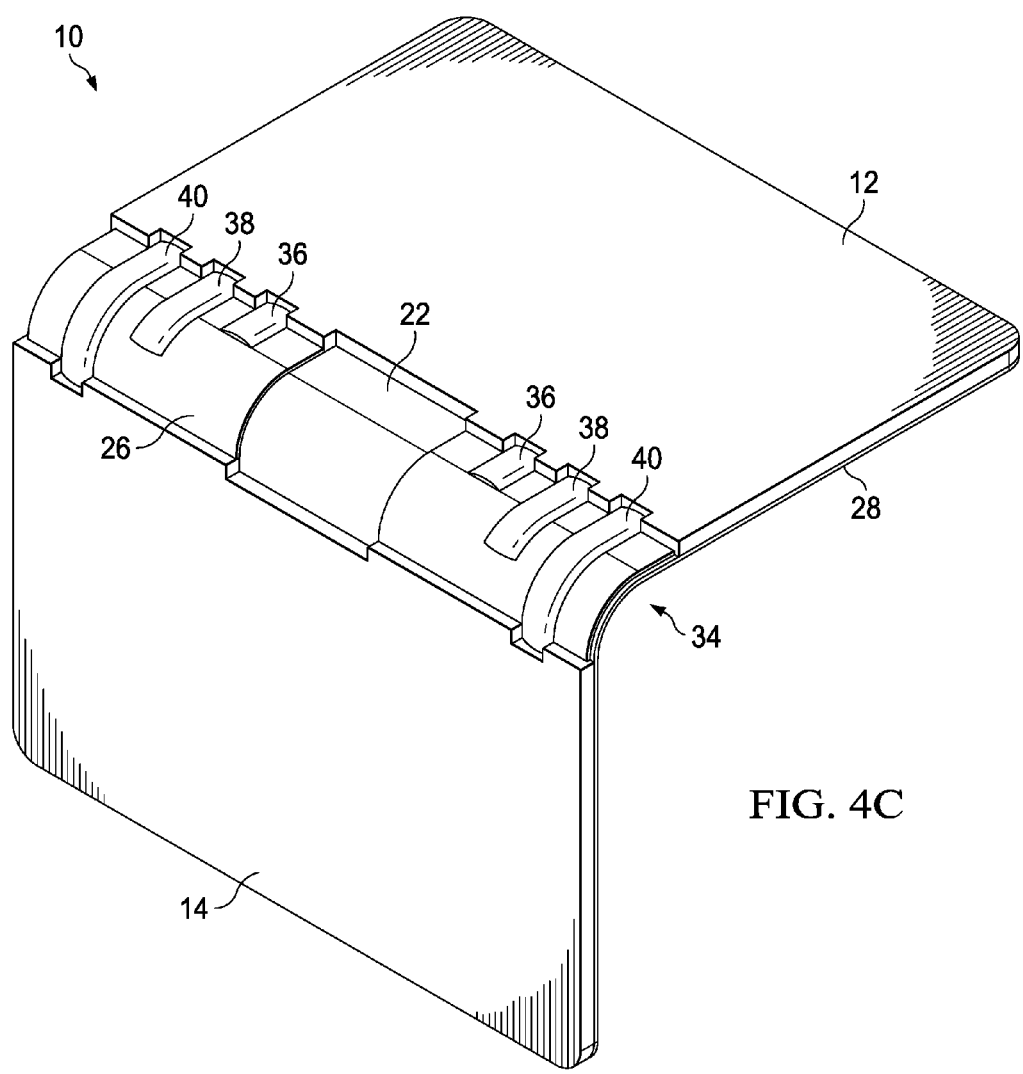
FIG. 4C illustrates a stagger staged arrangement of snapping bands in a hinge assembly arranged in a partially open position.

FIG. 4C illustrates a stagger staged arrangement of snapping bands in a hinge assembly arranged in a partially open position. In the illustrated embodiment, lid housing portion 14 may be rotated relative to main housing portion 12, such that portable information handling system 10 is in laptop position. Snapping bands 40 and 38 may disengage such that the bands begin to curl, as illustrated in FIG. 2A. The force of the lengthwise curls may apply an increased (compared to arranged discussed above with respect to FIG. 4B) closing force on hinge assembly 34. Snapping bands 36 may remain in engaged position, such that each snapping band extends in lengthwise straight position. Snapping bands 36 in engaged position may maintain portions of hinge assembly 34 and/or snapping bands 38 and 40 in a relatively flat position. Coupling material 26 and stabilizer 22 within hinge assembly 34 may bend near the curling portions of snapping bands 40 and 38, but otherwise remain flat near snapping bands 36. Coupling material 26, stabilizer 22, and the force of the lengthwise curl from snapping bands 40 and 38 may hold lid housing portion 14 in position relative to main housing portion 12.

Figure 4D:
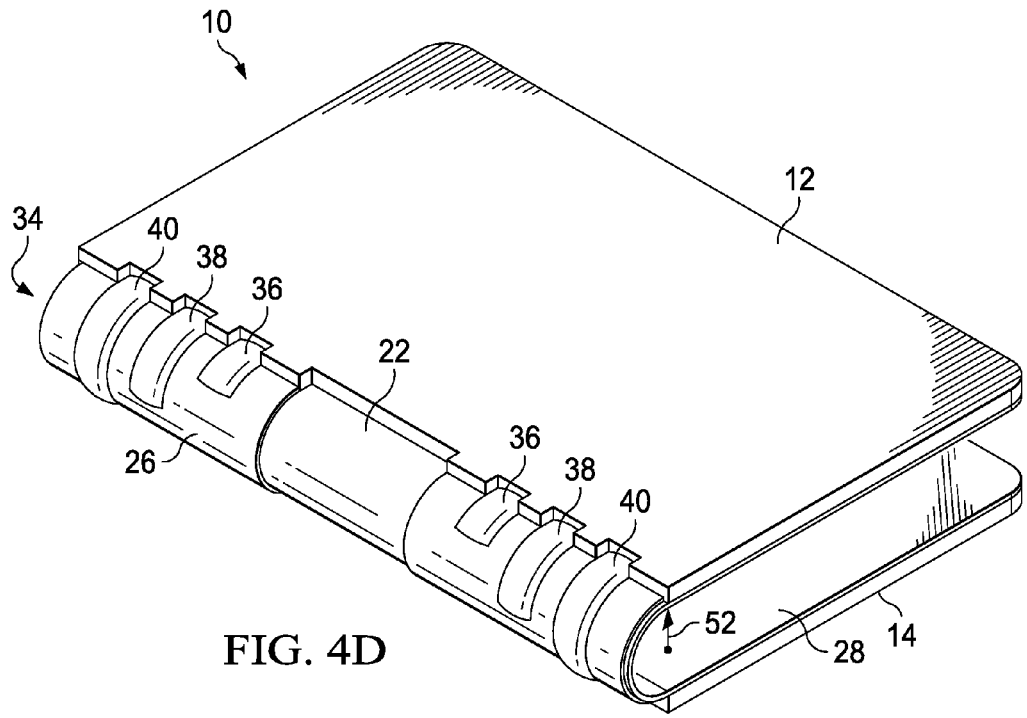
FIG. 4D illustrates a stagger staged arrangement of snapping bands in a hinge assembly arranged in a closed position.

FIG. 4D illustrates a stagger staged arrangement of snapping bands in a hinge assembly arranged in a close position. In the illustrated embodiment, lid housing portion 14 may be rotated relative to main housing portion 12, such that portable information handling system 10 is in closed position. Snapping bands 36, 38, and 40 may disengage such that the bands begin to curl, as illustrated in FIG. 2A. The force of the lengthwise curls may apply an increased (compared to arranged discussed above with respect to FIGS. 4A-C) closing force on hinge assembly 34. Coupling material 26 and stabilizer 22 within hinge assembly 34 may bend near snapping bands 44, 46, and 48. Coupling material 26, stabilizer 22, and the force of the lengthwise curl from snapping bands 36, 38, and 40 may hold lid housing portion 14 in position relative to main housing portion 12.

Similar to the gap staged hinge assembly discussed above with respect to FIGS. 3A-D, one or more of the snapping bands in the hinge assembly may engage as the housing portions of the portable information handling system are rotated between different positions. The engaging of a snapping band may increase the rigidity in the hinge assembly, and thus increase the stability to the housing portions of the system. Accordingly, the snapping bands in the hinge assembly may be staged to engage at particular angles of rotation that represent desirable positions of portable information handling system. Stabilizer 22, with its rigidity, may help hold hinge assembly at particular angles between the engagement and disengagement of snapping bands. The number, size, and placement of snapping bands may be selected based on the design, structural integrity, performance, and/or durability of hinge assembly 34 and/or portable information handling system 10.

In some embodiments, the snapping bands may be varied in placement, material, and/or dimension (e.g., the curvature of one or more of the axes, length, width, and/or the thickness of the material). For example, snapping band 40 may be the first snapping band to engage when lid housing portion 14 is raised from tablet position to laptop position. As such, snapping band 40 may experience the strongest rotational force caused by the weight of lid housing portion 14. Snapping band 40 may therefore be comprised of thicker and/or more rigid material (compared to snapping bands 36 and 38), and/or sized differently (e.g., larger width in snapping band 44) to increase the closing force applied by the band on the hinge assembly. Similarly, snapping bands 36 may be the last to disengage as the housing portions are rotated to closed position. As such, snapping bands 36 may need increased strength in engaged position (e.g., with an increased widthwise curvature) to offset the closing force of disengaged snapping bands 36 and 38.

The elements in hinge assembly 34 may selected to ensure a minimum bend radius of the hinge assembly. Minimum bend radius 52 illustrated in FIGS. 3-4 may ensure that display 28 does not bend past its recommended bend radius (e.g., the maximum bend that display 28 can withstand without compromising the structural integrity and continued operation of the display). Thus, hinge assembly 34 may protect display 28 from damage while also enabling the rotation of housing portions of the portable information handling system.

The hinge assembly elements in FIGS. 3-4 are for illustrative purposes only. The number, dimensions, placement, and materials of various elements comprising hinge assembly 34 (e.g., snapping bands 44, 46 and 48, and gaps 42 of FIGS. 3A-D, snapping bands 36, 38, and 40 of FIGS. 4A-D, and coupling material 26, stabilizer 22) may be selected based on a desired operation, performance, durability, cost, and/or performance of hinge assembly 34. For example, the elements may be selected to achieve a desired rigidity in the hinge assembly, such that a certain minimum force is required to rotate the lid housing portion relative to the main housing portion. More or fewer stages of snapping bands may be implemented in hinge assembly 34.

Figure 5:
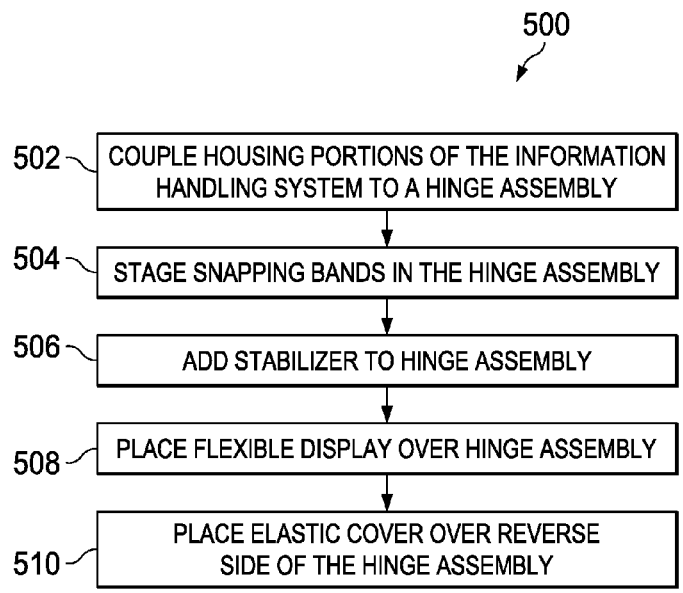
FIG. 5 illustrates a flowchart depicting selected elements of an embodiment of a method for rotationally coupling housing portions of an information handling system.

FIG. 5 illustrates an example method 500 for rotationally coupling housing portions of an information handling system. Method 500 may begin at step 502, where the housing portions of the information handling systems are coupled to a hinge assembly. The hinge assembly may permit the housing portions to rotate to different positions from each other, including for example, closed, laptop, and tablet positions discussed above with respect to FIG. 2. Each housing portion (e.g., main housing portion 12 and lid housing portion 14 illustrated in FIGS. 2-4) may couple to the hinge assembly.

In step 504, method 500 stages one or more snapping bands in the hinge assembly. In some embodiments, the snapping bands may be arranged in a gap staged formation as discussed above with respect to FIGS. 3A-D. In some embodiments, snapping bands may be arranged in a stagger staged formation as discussed above with respect to FIGS. 4A-D. In certain embodiments, snapping bands may be arranged in both a gap staged formation and a stagger staged formation. The snapping bands of the hinge assembly may support the hinge assembly as the housing portions of the information handling system are rotated to different positions relative to each other.

In step 506, method 500 adds one or more stabilizers to the hinge assembly. As explained above with respect to FIG. 2, the stabilizer may be comprised of a rigid yet bendable material that changes shape (e.g., bend or fold) in response to applied force. The rigidity of the stabilizer may affect how much force is required to the rotate hinge assembly open and closed.

In step 508, method 500 places a flexible display over the housing portions and hinge assembly. For example, the flexible display may be an OLED, as discussed in more detail with respect to FIG. 2. The flexible display may bend as the housing portions of the information handling system are rotated to different positions relative to each other.

In step 510, method 500 places an elastic cover over the reverse side of hinge assembly. The elastic cover may extend over the hinge assembly between the housing portions of the information handling system (e.g., similar to elastic cover 29 illustrated in FIG. 2). The elastic cover may protect the elements of the hinge assembly (e.g., snapping bands, stabilizer, and/or coupling material) from direct contact by objects and debris external to the portable information handling system. The elastic cover may also provide stability to hinge assembly by restricting the movement of various elements of the assembly. After step 510, method 500 may end.

Method 500 may be implemented in any suitable manner. It is noted that certain steps or operations described in method 500 may be optional or may be rearranged in different embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system comprising:
   a housing having a first housing portion and a second housing portion;
   a hinge assembly coupling the first and second housing portions, the hinge assembly comprising:
      a first snapping band with a bi-stable structure having an engaged and a disengaged position, the first snapping band configured to engage when the first and second housing portions are rotated at a first angle; and
      a second snapping band with a bi-stable structure having an engaged and a disengaged position, the second snapping band configured to engage when the first and second housing portions are rotated at a second angle;
      wherein the first snapping band is configured to remain engaged when the first and second housing portions are rotated between the first angle and the second angle; and
   a flexible display coupled to the first housing portion and the second housing portion, the flexible display covering the hinge assembly, the flexible display configured to bend when the first and second housing portions are rotated.

2. The system of claim 1, wherein the hinge assembly further comprises a stabilizer material, the stabilizer material configured to stabilize the first and second housing portions between the first and second angles.

3. The system of claim 1, wherein the second snapping band is configured to disengage when the first and second housing portions are rotated between the second angle and the first angle, wherein the first snapping band is configured to disengage when the first and second housing portions are rotated from the first angle to a closed position.

4. The system of claim 1, wherein the first snapping band is coupled to the first housing portion and the second snapping band is coupled to the second housing portion.

5. The system of claim 4, wherein the first snapping band is separated from the second snapping band by a gap.

6. The system of claim 1, wherein the first snapping band has a different length than the second snapping band.

7. The system of claim 1, wherein the first snapping band is a different thickness than the second snapping band.

8. A method of rotationally coupling housing portions of an information handling system, comprising:
   rotationally coupling a first housing portion and a second housing portion of the information handling system with a hinge assembly, the hinge assembly comprising:
      a first snapping band with a bi-stable structure having an engaged and a disengaged position, the first snapping band configured to engage when the first and second housing portions are rotated at a first angle; and
      a second snapping band with a bi-stable structure having an engaged and a disengaged position, the second snapping band configured to engage when the first and second housing portions are rotated at a second angle;
      wherein the first snapping band is configured to remain engaged when the first and second housing portions are rotated between the first angle and the second angle; and
   coupling a flexible display to the first housing portion and the second housing portion, the flexible display covering a portion of the hinge assembly, the flexible display configured to bend when the first and second housing portions are rotated.

9. The method of claim 8, wherein the hinge assembly further comprises a stabilizer material, the stabilizer material configured to stabilize the first and second housing portions between the first and second angles.

10. The method of claim 8, wherein the second snapping band is configured to disengage when the first and second housing portions are rotated between the second angle and the first angle, wherein the first snapping band is configured to disengage when the first and second housing portions are rotated from the first angle to a closed position.

11. The method of claim 8, wherein the first snapping band is coupled to the first housing portion and the second snapping band is coupled to the second housing portion.

12. The method of claim 11, wherein the first snapping band is separated from the second snapping band by a gap.

13. The method of claim 8, wherein the first snapping band has a different length than the second snapping band.

14. The method of claim 8, wherein the first snapping band is a different thickness than the second snapping band.

* * * * *